United States Patent [19]

Sendijarevic et al.

[11] Patent Number: 6,111,049

[45] Date of Patent: *Aug. 29, 2000

[54] POLYURETHANES HAVING IMPROVED MOISTURE RESISTANCE

[75] Inventors: Aisa Sendijarevic; Vahid Sendijarevic, both of Troy; Kurt C. Frisch, Grosse Ile, all of Mich.; Jozef Lucien Rudolf Cenens, Linden, Belgium; Dale L. Handlin, Jr., Houston, Tex.; Steven S. Chin, Houston, Tex.; Hector Hernandez, Houston, Tex.

[73] Assignee: Shell Oil Company, Houston, Tex.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/598,858

[22] Filed: Feb. 9, 1996

[51] Int. Cl.$^7$ ..................................................... C08G 18/10
[52] U.S. Cl. .............................. 528/65; 528/59; 528/66; 528/75; 528/76; 528/85
[58] Field of Search ............................... 528/85, 59, 65, 528/66, 75, 76

[56] References Cited

U.S. PATENT DOCUMENTS

| | | | |
|---|---|---|---|
| 3,427,366 | 2/1969 | Verdol et al. | 260/859 |
| 3,598,882 | 8/1971 | Brinkmann . | |
| 3,895,149 | 7/1975 | Sheffler et al. | 428/94 |
| 3,987,012 | 10/1976 | Statton | 260/77.5 |
| 4,053,446 | 10/1977 | Watabe et al. . | |
| 4,107,256 | 8/1978 | Conrad et al. | 264/310 |
| 4,245,081 | 1/1981 | Quiring et al. | 528/65 |
| 4,329,277 | 5/1982 | Murphy | 523/122 |
| 4,371,684 | 2/1983 | Quiring et al. | 528/85 |
| 4,376,834 | 3/1983 | Goldwasser et al. | 521/159 |
| 4,507,430 | 3/1985 | Shimada et al. | 524/504 |
| 4,532,316 | 7/1985 | Henn | 528/59 |
| 4,582,879 | 4/1986 | Frisch et al. | 525/424 |
| 4,603,188 | 7/1986 | Kusakawa et al. | 528/60 |
| 4,705,721 | 11/1987 | Frisch et al. | 428/349 |
| 4,722,946 | 2/1988 | Hostettler | 521/158 |
| 5,013,811 | 5/1991 | Ross | 528/60 |
| 5,167,899 | 12/1992 | Jezic | 264/510 |
| 5,234,996 | 8/1993 | Mori et al. | 528/75 |
| 5,318,813 | 6/1994 | Flexman, Jr. | 428/36.9 |
| 5,344,882 | 9/1994 | Flexman | 525/131 |
| 5,393,843 | 2/1995 | Handlin, Jr. et al. | 525/332.8 |
| 5,405,911 | 4/1995 | Handlin, Jr. et al. | 525/139 |
| 5,486,570 | 1/1996 | St. Clair | 525/123 |

FOREIGN PATENT DOCUMENTS

| | | |
|---|---|---|
| 87/73299 | 1/1980 | Australia . |
| 0020774 | 1/1981 | European Pat. Off. . |
| 0 047 081 | 3/1982 | European Pat. Off. . |
| 0114185 | 8/1984 | European Pat. Off. . |
| 0380389 | 8/1990 | European Pat. Off. . |
| 0 624 612 A1 | 11/1994 | European Pat. Off. . |
| 0624612 | 11/1994 | European Pat. Off. . |
| 2742879 | 4/1979 | Germany . |
| 87017845 | 5/1985 | Japan . |
| 0 1138 220 | 11/1987 | Japan . |
| 88015294 | 4/1988 | Japan . |
| 0 3016 702 | 6/1989 | Japan . |
| 90051950 | 6/1990 | Japan . |
| 91013269 | 2/1991 | Japan . |
| 94041580 | 1/1994 | Japan . |
| 2270317 | 8/1993 | United Kingdom . |

OTHER PUBLICATIONS

U.S. application Ser. No. 08/494,639, filed Jun. 23, 1995, Cenens et al.

U.S. application Ser. No. 08/494,640, filed Jun. 23, 1995, Cenens.

Y. Camberlin, et al, "Model Hard Segments from Diphenyl Methane Diisocyanate and Different Chain Extenders, and Corresponding Linear Block Polyurethanes" *Journal of Polymer Science: Polymer Chemistry Edition*, 20 1445–1456 (1982).

L. Cuve, et al "Synthesis and Properties of Polyurethanes Based on Polyolefin: 1. Rigid Polyurethanes and Amorphous Segmented Polyurethanes Prepared in Polar Solvent Under Homogeneous Conditions", *Polymer*, 32(2)343–352 (1991).

L. Cuve, et al, "Synthesis and Properties of Polyurethanes Based on Polyolefin: 2. Semicrystalline Segmented Polyurethanes Prepared Under Heterogeneous or Homogeneous Synthesis Conditions" *Polymer*, 33(18) 3957–3967 (1992).

G. Boiteux, et al, "Synthesis and Properties of Polyurethanes Based on Polyolefin: 3. Monitoring of Phase Separation by Dielectric Relaxation Spectroscopy of Segmented Semicrystalline Polyurethane Prepared in Bulk by the Use of Emulsifiers", *Polymer* 35(1) 173–178 (1994).

S. Etienne, et al, "Microstructure of Segmented Amorphous Polyurethanes: Small–angle X–ray Scattering and Mechanical Spectroscopy Studies", *Polymer* 35 (13) 2737–2743 (1994).

R.L. Zapp, et al, "Isocyanate Reactions with Difunctional Polyisobutylenes" *Rubber Chemistry and Technology*, 1154–1187 (1970).

V.S.C. Chang, et al, "Gas Permeability, Water Adsorption, Hydrolytic Stability and Air–Oven Aging of Polyisobutylene–Based Polyurethane Networks" *Polymer Bulletin* 8 69–74 (1982).

(List continued on next page.)

*Primary Examiner*—John M. Cooney, Jr.

[57] ABSTRACT

Thermoplastic polyurethanes are formed from a hydrogenated polydiene diol having from 1.6 to 2 terminal hydroxyl groups per molecule and a number average molecular weight between 500 and 20,000, an isocyanate having two isocyanate groups per molecule, and optionally a chain extender having two hydroxyl groups per molecule. The thermoplastic polyurethanes have excellent resistance to moisture as evidenced by retention of more than 70%, preferably at least 85%, of original tensile strength after aging in water for 7 days at a temperature of at least 70° C. Preparation by a prepolymer method with subsequent addition of the chain extender is preferred.

10 Claims, No Drawings

OTHER PUBLICATIONS

R.R. Lagasse, "Domain Structure and Time–Dependent Properties of a Crosslinked Urethane Elastomer" *Journal of Applied Polymer Science* 21: 2489–2503 (1977).

K. Ono, et al, "Effects of Number–Average Molecular Weight of Liquid Hydroxyl–Terminated Polybutadiene on Physical Properties of the Elastomer" *Journal of Applied Polymer Science* 21 3223–3235 (1977).

C.M. Brunette, et al "Structural and Mechanical Properties of Polybutadiene–Containing Polyurethanes" *Polymer Engineering and Science* 21(3) 163–171 (1981).

M. Xu, et al, "Structure and Morphology of Segmented Polyurethanes: 1. Influence of Incompatility on Hard–Segment Sequence Length" *Polymer* 24 1327–1332 (1983).

C.H.Y. Chen, et al, "Structure and Morphology of Segmented Polyurethanes: 2. Influence of Reactant Incompatibility" *Polymer* 24 1333–1340 (1983).

J.A. Verdol, et al, "Liquid Castable Elastomers from Hydroxyl–Terminated Polybutadienes. Part 1—Hydroxyl–Terminated Polybutadienes in One–Step Urethane Reactions" *Rubber Age* 57–64, Jul. 1966.

"Hydroxyl Terminated PolyBD Resins in Urethane Elastomers" Sartomer Company Sales Brochure (1988).

P.H. Eacheger, "PolyBD in Polyurethane Sealants", *Adhesion*, No. 1, 7–9, Jan./Feb. 1992.

Sinsiskii, et al, "thermoplastic Polydiene Urethane Block Copolymers and Their Dynamic Mechanical Properties" *Uretanouye Elastomery* 132–138 (1972). (Article plus English Abstract).

A.G. Makhmurnu, et al, "Properties of Polydieneurethane Thermoplastic Elastomers" *Obuv. Prom.* 13(5) 47–50 (1971). (Article plus English Abstract).

V.P. Kaclzheva, et al, "Preparation of Unsaturated Polyurethane Rubbers by using Hydroxylated Polydiene" *Tr. Kazan Khim. Technol. Inst.* No. 36 451–456 (1967).

M. Zachcriesiewicz, "Urethanes a Base de Resines de PolyBD pour Performances Electriques" *Caoutchaucs et Plastics*, No. 665, 33–37, Dec. 1986.

the polymer. The living polymer is then capped with ethylene oxide and terminated with methanol. The silyl ether is then removed by acid catalyzed cleavage to yield the desired hydroxyl functionality.

POLYURETHANES HAVING IMPROVED MOISTURE RESISTANCE

FIELD OF THE INVENTION

This invention relates to polyurethane elastomer compositions produced from a polymeric diol, especially thermoplastic polyurethane compositions produced from an anionically polymerized hydrocarbon diol having two terminal hydroxyl groups.

BACKGROUND OF THE INVENTION

Cast and thermoplastic polyurethane compositions based on the reaction of polyisocyanates with polymeric diols are well known for use as elastomers, adhesives, sealants, elastomeric surface coatings, and coatings for metals and plastics. Kuraray markets a partially hydrogenated polyisoprene diol which is described in product brochures as useful in making polyurethanes when reacted with isocyanates and various chain extenders. The diol has a number average molecular weight of 3800, a broad molecular weight distribution and a hydroxyl content of about 2.2 terminal hydroxyl groups per molecule. Typically the hydrogenation of this product is around 80%.

The isocyanates described by Kuraray include MDI, IPDI, and TDI. The chain extenders described by Kuraray include 1,4-butane diol, 2-ethyl-1,3-hexane diol, 3-methyl-1,5-pentane diol and 1,9-nonane diol. The polyurethanes have properties consistent with addition of a 3800 molecular weight partially hydrogenated polyisoprene to the polyurethane structure, including good hydrolysis resistance.

The average functionality of the Kuraray materials being above 2 makes these products unsuitable for thermoplastic polyurethane application. Thermoplastic polyurethanes (TPU) allow the production of elastomeric materials by thermoplastic processing techniques. TPU's may not thermally degrade when subjected to temperatures and pressures necessary for melt processing. Therefore the TPU macromolecules have to be linear and not substantially branched macromolecules which cannot be repeatedly thermoformed. Only bifunctional isocyanates, chain extenders and long chain diols can be used to make thermoplastic polyurethanes.

It is an object of the present invention to provide thermoplastic polyurethane compositions having improved resistance to hydrolytic degradation caused by exposure to water at elevated temperatures for short times.

SUMMARY OF THE INVENTION

The present invention is thermoplastic polyurethane compositions which retain over 70%, preferably at least 85%, of the original tensile strength after aging in water for 7 days at 70° C. The polyurethane compositions are produced by reaction of hydrogenated polydiene diols having from 1.6 to 2, more preferably 1.8 to 2, and most preferably 1.9 to 2, terminal hydroxyl groups per molecule and a number average molecular weight between 500 and 20,000, more preferably between 1,000 and 10,000. The polydiene diol is hydrogenated to remove at least 90%, preferably at least 95%, of the original olefinic unsaturation. The polydiene diols are reacted with an isocyanate having two isocyanates groups per molecule, and optionally with a low molecular weight chain extender having two hydroxyl groups per molecule. Absent the chain extender, the product is reactive prepolymer which can be reacted with a chain extender in a subsequent step.

DETAILED DESCRIPTION OF THE INVENTION

The present invention is thermoplastic polyurethane compositions which retain over 70%, preferably at least 85%, of the original tensile strength after aging in water for 7 days at 70° C. The polyurethane compositions are produced by reacting hydrogenated polydiene diols having from 1.6 to 2, more preferably 1.8 to 2, and most preferably 1.9 to 2, terminal hydroxyl groups per molecule and a number average molecular weight between 500 and 20,000, more preferably between 1,000 and 10,000, with an isocyanate having two isocyanate groups per molecule, and optionally with a low molecular weight chain extender having two hydroxyl groups per molecule.

The polydiene diols used in this invention are prepared anionically such as described in U.S. Pat. Nos. 5,376,745, 5,391,663, 5,393,843, 5,405,911, and 5,416,168 which are incorporated by reference herein. The polydiene diols have from 1.6 to 2, more preferably from 1.8 to 2, and most preferably from 1.9 to 2 terminal hydroxyl groups per molecule, and a number average molecular weight between 500 and 20,000, more preferably between 1000 and 10,000. Hydrogenated polybutadiene diols are preferred and have 1,4-addition between 30% and 70% to minimize viscosity.

Polymerization of the polydiene diols commences with a monolithium or dilithium initiator which builds a living polymer backbone at each lithium site. The conjugated diene is typically 1,3-butadiene or isoprene. The anionic polymerization is done in solution in an organic solvent, typically a hydrocarbon like hexane, cyclohexane or benzene, although polar solvents such as tetrahydrofuran can also be used. When the conjugated diene is 1,3-butadiene and when the resulting polymer will be hydrogenated, the anionic polymerization of butadiene in a hydrocarbon solvent like cyclohexane is typically controlled with structure modifiers such as diethylether or glyme (1,2-diethoxyethane) to obtain the desired amount of 1,4-addition. The optimum balance between low viscosity and high solubility in a hydrogenated polybutadiene polymer occurs between ratios of 1,4-butadiene/1,2-butadiene from 60/40 to 40/60. This butadiene microstructure is achieved during polymerization at 50° C. in cyclohexane containing about 6% by volume of diethylether or about 1000 ppm of glyme.

Anionic polymerization is terminated by addition of a functionalizing agent like those in U.S. Pat. Nos. 5,391,637, 5,393,843, and 5,418,296, which are also incorporated by reference, but preferably ethylene oxide, prior to termination.

The preferred di-lithium initiator is formed by reaction of two moles of sec-butyllithium with one mole of diisopropylbenzene. This diinitiator is used to polymerize butadiene in a solvent composed of 90% w cyclohexane and 10% w diethylether. The molar ratio of diinitiator to monomer determines the molecular weight of the polymer. The living polymer is then capped with two moles of ethylene oxide and terminated with two moles of methanol to yield the desired polydiene diol.

The polydiene diol can also be made using a monolithium initiator which contains a hydroxyl group which has been blocked by a silyl ether group (as in U.S. Pat. Nos. 5,376,745 and 5,416,168 which are also incorporated by reference). A suitable initiator is hydroxypropyllithium in which the hydroxyl group is blocked as the trimethylsilyl ether. This mono-lithium initiator can be used to polymerize butadiene in hydrocarbon or polar solvent. The molar ratio of initiator to monomer determines the molecular weight of the polymer. The living polymer is then capped with one mole of ethylene oxide and terminated with one mole of methanol to yield the mono-hydroxy polydiene polymer. The silyl ether can then be removed by acid catalyzed cleavage in the presence of water yielding the desired dihydroxy polydiene diol. Alternatively, the protecting groups are removed after hydrogenation.

The polybutadiene diols are hydrogenated such that at least 90%, preferably at least 95%, of the carbon to carbon double bonds in the diols are saturated. Hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. A particularly preferred catalyst is a mixture of nickel 2-ethylhexanoate and triethylaluminum.

The polybutadiene polymer have no less than about 40% 1,2-butadiene addition because, after hydrogenation, the polymer will be a waxy solid at room temperature if it contained less than about 40% 1,2-butadiene addition. To minimize viscosity of the diol, the 1,2-butadiene content should be between about 40 and 60%. The isoprene polymers have no less than 80% 1,4-isoprene addition in order to reduce Tg and viscosity. The diene microstructures are typically determined by $C^{13}$ nuclear magnetic resonance (NMR) in chloroform.

The polydiene diols have hydroxyl equivalent weights between about 250 and about 10,000, preferably between 500 and 5,000. Thus, for di-hydroxy polydiene polymers, suitable number average molecular weights will be between 500 and 20,000, preferably between 1,000 and 10,000.

The number average molecular weights referred to here are measured by gel permeation chromatography (GPC) calibrated with polybutadiene standards having known number average molecular weights. The solvent for the GPC analyses is tetrahydrofuran.

The isocyanate used in this invention is a diisocyanate having a functionality of two isocyanate groups per molecule. Diisocyanates produce thermoplastic polyurethane compositions when combined with a polydiene diol having no more than two hydroxyl groups per molecule. Examples of suitable diisocyanates are 4,4'-diphenylmethane diisocyanate, mixtures of isomers of diphenylmethane diisocyanate, toluene diisocyanate, paraphenyldiisocyanate, isophoronediisocyanate, 4,4'-methylene-bis (cyclohexylisocyanate), naphthalene diisocyanate, hexamethylenediisocyanate, ethylenediisocyanate, etc. Difunctional isocyanate prepolymers made by reaction of an isocyanate with a difunctional extender may also be used.

The chain extender used to make the thermoplastic polyurethane compositions are low molecular weight diols having two hydroxyl groups per molecule. The prefered chain extenders have methyl, ethyl, or higher carbon side chains which make these diols more apolar and therefore more compatible with the apolar hydrogenated polydienes. Examples of such chain extenders are 2-methyl-1,3-propanediol, 2-ethyl-1,3-hexanediol, 2,2-dimethyl-1,3-pentanediol, 2-ethyl-2-butyl-1,3-propanediol, and 2,2,4-trimethyl-1,3-pentane diol. Linear chain extenders without carbon side chains such as 1,4-butane diol, ethylene diamine, 1,6-hexane diol, and the like, also result in polyurethane compositions if the components are well mixed or if a prepolymer method is used to improve compatibility.

A preferred way to make TPU's is by the prepolymer method where the isocyanate component is reacted first with the polydiene diol to form a isocyanate terminated prepolymer, which can then be reacted further with the chain extender of choice. The reaction with the chain extender can optionally include additional isocyante component. The polyurethane compositions can be formulated to make elastomers using a solventless prepolymer method or a solvent/prepolymer method as described in more detail below.

In the solventless prepolymer method, the hydrogenated polydiene diol is heated to at least 70° C., preferably less than 100° C., and then mixed with the desired amount of isocyanate. If the prepolymer reaction is slow, the addition of catalysts such as organo-tin compounds can substantially accelerate the reaction. The prepolymer is stored under nitrogen prior to heating to a temperature from 90° C. to 100° C. The desired amount of chain extender is added and thoroughly mixed before pouring into a heated mold treated with a mold release compound. The polyurethane composition is formed by curing in the mold at 80° C. to 120° C. for several hours. Optionally, the TPU can be postcured above 100° C. for at least 2 hours.

In the solvent/prepolymer method, the polydiene diol is dissolved in a solvent, preferably dry toluene, heated to at least 70° C. and not more than 100° C., and then mixed with an isocyanate having two isocyanates group per molecule for at least 1 hour under nitrogen flow. The desired type and amount of chain extender is added and thoroughly mixed until the reaction is complete. After the solvent is removed, the mixture is then postcured for at least 2 hours at 110° C. while under vacuum. The thermoplastic polyurethane composition can then be melt processed above the elastomer melting point to form an elastomeric polyurethane article.

A composition of the instant invention may contain plasticizers, such as oils used in conventional rubber compounds. Such oils can be used in the present TPU's because the polydiene diol is a hydrocarbon rubber. Rubber compounding oils are well-known in the art and include both high saturates content oils and high aromatics content oils. Preferred plasticizers are highly saturated oils (like Tufflo® 6056 and 6204 oil made by Arco) and process oils (like Shellflex® 371 oil made by Shell). The amounts of rubber compounding oil employed in the invention composition can vary from 0 to about 500 phr, preferably between about 0 to about 100 phr, and most preferably between about 0 and about 60 phr.

A wide variety of fillers can be used in formulations with the present invention. Suitable fillers include calcium carbonate, clays, talcs, zinc oxide, titanium dioxide, silica and the like. The amount of filler usually is in the range of 0 to about 800 phr, depending on the type of filler used and on the application for which the formulation is intended. Preferred fillers are silica and titanium dioxide. The filler should be thoroughly dried in order that adsorbed moisture will not interfere with the reaction between the polyisocyanate and the saturated, polyhydroxylated polydiene polymer.

Stabilizers known in the art may also be incorporated into the composition. These may be for protection during the life of the finished product against, for example, oxygen, ozone and ultra-violet radiation. These may also be for stabilization against thermo-oxidative degradation during elevated temperature processing. Antioxidants and UV inhibitors which interfere with the urethane curing reaction must be avoided. Preferred antioxidants are the sterically hindered phenolic compounds like butylated hydroxy toluene. Stabilizers such as organ-phoshites are also useful. Preferred UV inhibitors are UV absorbers such as benzotriazole compounds. The amount of stabilizer in the formulation will depend greatly on the intended application of the product. If processing and durability requirements are modest, the amount of stabilizer in the formulation will be less than about 1 phr. If the polyurethane product will be processed at high temperature or if the product must survive many years in service, stabilizer concentration could be as much as about 10 phr.

DETAILED DESCRIPTION OF PREFERRED EMBODIMENTS

The preferred embodiment of the present invention is thermoplastic polyurethanes which retain at least 85% of the original tensile strength after aging in water for 7 days at a temperature of at least 70° C. The thermoplastic polyurethanes most preferably are produced by pre-reaction of a hydrogenated polybutadiene diol having from 1.9 to 2.0 terminal hydroxyl groups per molecule, 1,4-addition between 40% and 60%, and a number average molecular weight between 1,000 and 10,000, and an isocyanate having two isocyanate groups per molecule. The resulting prepolymers is then reacted with the chain extender such as 1,4-butanediol, 2-ethyl-1,3-hexane diol, or 2,2,4-trimethyl-1,3-pentanediol.

The following examples show that thermoplastic polyurethane compositions with excellent resistance to hot water are produced using a one-shot method or the preferred prepolymer method with chain extenders such as 1,4-butanediol and 2,2,4-trimethyl-1,3-pentanediol.

EXAMPLE 1

A linear, hydrogenated butadiene diol polymer having 1.95 terminal hydroxyl groups per molecule, a number average molecular weight of 3650, and a 1,2-addition of butadiene of 43%, was obtained from Shell Chemical. This polymer is a viscous liquid at 25° C. but flows readily at slightly elevated temperatures (20 poise viscosity at 60° C.).

A thermoplastic polyurethane elastomer was produced by a solventless one-shot method by combining 77.8% by weight of the hydrogenated butadiene diol with 17.8% by weight of MONDUR M, a 4,4'-diphenylmethane diisocyanate of functionality 2.0 from Bayer, and 4.4% by weight of 1,4-butanediol. The diols were preheated to a temperature from 90° C. to 100° C. and mixed for 2 minutes. The diisocyanate was melted at a temperature from 70° C. to 80° C. and then vigorously mixed with the diols for 1 minute. The mixture of reactants was then poured into a Teflon coated mold preheated to 105° C. When the mixture started to gel, the composition was compression molded in a Carver press at 105° C. and a pressure of 20,000 psi for 1 hour. The polyurethane composition was then post cured in an oven at 105° C. for 16 hours.

The resulting thermoplastic polyurethane composition was tested for Shore A hardness (ASTM D-2240-75), tensile strength, 100% modulus, 300% modulus, elongation at break, and tear strength (ASTM D-624-72). Results are shown in Table 1.

The polyurethane composition was then aged in hot water for 7 days at 70° C. and retested for hardness, tensile strength, and elongation at break. Results are shown in Table 2.

COMPARISON EXAMPLES 2–4

The procedures of Example 1 were used as shown in Tables 1 and 2 to make initial and aged polyurethanes from TERATHANE 2000, a poly(oxytetramethylene)glycol from Dupont, TONE 0240, a poly(caprolactone)glycol from Union Carbide, and FORMREZ 66-73, a poly(1,6-hexanedioladipate) from Witco Chemical Co. As shown in Tables 1 and 2, the polybutadiene diol of Example 1 retained over 70% of the original tensile strength in comparison to poor retention of tensile strength by FORMREZ 66-37.

COMPARISON EXAMPLES 5–6 AND EXAMPLES 7–9

The procedures of Example 1 were used as shown in Tables 3 and 4 to make initial and aged polyurethanes from the hydrogenated polybutadiene diol with varying amounts of the isocyanate. The 1,4-butane diol was replaced with 2,2,4-trimethyl-1,3-pentanediol to improve compatibility. The amount of isocyanate was varied to establish that optimal chain extension had been achieved. The NCO/OH ratios reported in the Tables are based on the estimated equivalents for the hydrogenated butadiene diol and it was possible that a ratio near 1 would provide insufficient isocyanate groups to achieve optimal chain extension.

The results in Tables 3 and 4 show that the retention of tensile strength after immersion in water at 100° C. increased substantially when the estimated NCO/OH ratio exceeded 1.04 which indicates that Comparison Examples 5 and 6 were not fully extended and that a slight reduction in number average molecular weight substantially reduces the resistance of the polyurethanes to hot water.

EXAMPLES 10, 12 AND COMPARISON EXAMPLE 11

The linear, hydrogenated butadiene diol polymer of Example 1 was used to prepare polyurethanes by a solventless prepolymer method by combining the hydrogenated butadiene diol with the isocyanate prior to reaction with the chain extender. Amounts of the components are shown in Table 5. The hydrogenated polybutadiene diol was heated to 75° C. and gradually mixed into MONDUR M, a 4,4'-diphenylmethane diisocyanate of functionality 2.0 from Bayer, which had been preheated to 70° C., until a target NCO/OH ratio was achieved. A small amount of benzoyl chloride (0.3 wt %) was added to the diisocyanate prior to addition to the hydrogenated polybutadiene diol. The prepolymer was then stored under nitrogen until preparation of the polyurethane.

The chain extender was 1,4-butanediol, 2,2,4-trimethyl-1,3-pentanediol, or a mixture of both diols. The chain extender(s) diols were preheated to 100° C. and added to the prepolymer which was preheated to a temperature from 90° C. to 100° C. The mixture was then was then poured into a Teflon coated mold preheated to 105° C. When the mixture started to gel, the composition was compression molded in a Carver press at 105° C. and a pressure of 20,000 psi for 1 hour. The polyurethane composition was then post cured in an oven at 105° C. for 16 hours.

The resulting thermoplastic polyurethane compositions were tested for Shore A hardness (ASTM D-2240-75), tensile strength, 100% modulus, 300% modulus, elongation at break, and tear strength (ASTM D-624-72). Results are shown in Table 5.

The polyurethane compositions were then aged in hot water for 7 days at 100° C. and retested for hardness, tensile strength, modulus, and elongation at break. Results are shown in Table 6. The low performance of Comparison Example 11 likely results from a marginal NCO/OH ratio as previously discussed for Comparison Examples 5 and 6.

COMPARISON EXAMPLE 13

The procedures of Example 10 were used as shown in Tables 5 and 6 to make initial and aged polyurethanes from TERATHANE 2000, a poly(oxytetramethylene)glycol from Dupont. As shown in Tables 5 and 6, the polybutadiene diol of Example 10 made a polyurethane that slightly increased tensile strength after aging 7 days in water at 100° C. while the tensile strength of the comparison polyurethane substantially decreased by more than 50%.

COMPARATIVE EXAMPLE 14

The linear, hydrogenated polybutadiene diol polymer of Example 1 was used to prepare a thermosetting polyurethane by a solventless prepolymer method by combining the hydrogenated polybutadiene diol with the isocyanate prior to reaction with the chain extender. Amounts of the components are shown in Table 7. The hydrogenated butadiene diol was heated to 75° C. and gradually mixed into MONDUR TD-80, a mixture of 80% 2,4-toluenediisocyanate and 20% 2,6-toluenediisocyanate of functionality 2.0 from Bayer, which had been preheated to 70° C., until a target NCO/OH ratio was achieved. A small amount of benzoyl chloride (0.3 wt %) was added to the diisocyanate prior to addition to the butadiene diol. The prepolymer was then stored under nitrogen until preparation of the polyurethane.

The curing agent was CURENE 442, which is 4,4'-methylene-bis-(2-chloroaniline) from Anderson Development Co. The curing agent was melted at 110° C. and added to the prepolymer which was preheated to a temperature of 100° C. The prepolymer was vigorously mixed with an additional amount of the diisocyanate prior to addition of the curing agent to give a hard segment of 22%. Addition of the curing agent required further vigorous mixing for 30 to 40 seconds. The mixture was then poured into a Teflon coated mold preheated to 105° C. When the mixture started to gel after 2 to 3 minutes, the composition was compression molded in a Carver press at 105° C. and a pressure of 20,000 psi for 1 hour. The polyurethane composition was then post cured in an oven at 105° C. for 16 hours.

The resulting thermoplastic polyurethane composition was tested for Shore A hardness (ASTM D-2240-75), tensile strength, 100% modulus, 300% modulus, elongation at break, and tear strength (ASTM D-624-72). Results are shown in Table 7.

The polyurethane composition was then aged in hot water for 7 days at 100° C. and retested for hardness, tensile strength, and elongation at break. Results are shown in Table 8. The polyurethane actually increased in tensile strength during the humid aging process.

COMPARISON EXAMPLES 15–17

The procedures of Example 14 were used as shown in Tables 7 and 8 to make initial and aged thermosetting polyurethanes from TERATHANE 2000, a poly(oxytetramethylene)glycol from Dupont, PPG 2000, a poly(oxypropylene) glycol from BASF, and PPG 4000, a poly(oxypropylene)glycol from BASF. The polyurethane compositions lost nearly all of their tensile strength compared to Example 14 after aging in 100° C. water for 7 days.

TABLE 1

One Shot Polyurethanes (Butane Diol/MDI System)

|  | 1 | C2 | C3 | C4 |
|---|---|---|---|---|
| Ingredients (wt. %) | | | | |
| EB DIOL | 77.8 | | | |
| TERATHANE 2000 | | 77.9 | | |
| TONE 0240 | | | 77.8 | |
| FORMREZ 66-37 | | | | 78.0 |
| Butane Diol | 4.4 | 3.2 | 3.2 | 4.0 |
| MDI | 17.8 | 18.9 | 19.0 | 18.0 |
| Hard Phase, % | 22 | 22 | 22 | 22 |
| NCO/OH Ratio | 1.02 | 1.02 | 1.02 | 1.02 |
| Properties | | | | |
| Shore A | 75 | 78 | 81 | 95 |
| Tensile Strength, psi | 1002 | 3490 | 4135 | 3400 |
| 100% Modulus, psi | 240 | 353 | 618 | 966 |
| 300% Modulus, psi | 400 | 526 | 733 | 1076 |
| Elongation at Break, % | 1200 | 1140 | 1373 | 1108 |
| Tear Strength, pli | 273 | 353 | 274 | 714 |

EB Diol: HPVM-2202, Shell Chemical Co.  OH EW 1800
TERATHANE 2000: PTMO, DuPont  OH EW 1000
TONE 0240: Polycaprolactone, Union Carbide  OH EW 1000
FORMREZ 66-37: Hexane diol adipate, Witco  OH EW 1516
MDI: Mondur M, Bayer

TABLE 2

One Shot Polyurethanes of Table 1 — AGED

|  | 1 | C2 | C3 | C4 |
|---|---|---|---|---|
| Ingredients (wt. %) | | | | |
| EB DIOL | 77.8 | | | |
| TERATHANE 2000 | | 77.9 | | |
| TONE 0240 | | | 77.8 | |
| FORMREZ 66-37 | | | | 78.0 |
| Butane Diol | 4.4 | 3.2 | 3.2 | 4.0 |
| MDI | 17.8 | 18.9 | 19.0 | 18.0 |
| Hard Phase, % | 22 | 22 | 22 | 22 |
| NCO/OH Ratio | 1.02 | 1.02 | 1.02 | 1.02 |
| Properties: Aged | | | | |
| Hot water, 90° C. for 7 days | | | | |
| Shore A | 72 | N/A | 80 | 90 |
| Tensile Strength, psi | 722 | N/A | 2897 | 1087 |
| Tensile Retention, % | 72 | N/A | 70 | 32 |
| Elongation at Break, % | 1660 | N/A | 1103 | 760 |
| Water Uptake (wt. %) | | | | |
| 70° C., 3 days | .28 | .83 | .91 | .95 |
| 5 days | .36 | .46 | .8 | .8 |
| 7 days | .4 | .61 | .86 | .89 |

EB Diol: HPVM-2202, Shell Chemical Co.  OH EW 1800
TERATHANE 2000: PTMO, DuPont  OH EW 1000
TONE 0240: Polycaprolactone, Union Carbide  OH EW 1000
FORMREZ 66-37: Hexane diol adipate, Witco  OH EW 1516
MDI: Mondur M, Bayer

TABLE 3

One Shot polyurethanes (Pentane Diol/MDI System)

|  | C5 | C6 | 7 | 8 | 9 |
|---|---|---|---|---|---|
| Ingredients (wt. %) | | | | | |
| EB DIOL | 77.7 | 77.8 | 78.0 | 77.4 | 55.9 |
| Pentane Diol | 6.1 | 5.9 | 5.8 | 5.9 | 14.6 |

TABLE 3-continued

One Shot polyurethanes (Pentane Diol/MDI System)

|  | C5 | C6 | 7 | 8 | 9 |
|---|---|---|---|---|---|
| MDI | 16.2 | 16.2 | 16.2 | 16.7 | 29.5 |
| Hard Phase, % | 22 | 22 | 22 | 22 | 44 |
| NCO/OH Ratio | 1.02 | 1.04 | 1.06 | 1.08 | 1.05 |
| Properties |  |  |  |  |  |
| Shore A | 79 | 80 | 77 | 80 | 85 |
| Tensile Strength, psi | 1945 | 1940 | 1925 | 1922 | 2227 |
| 100% Modulus, psi | 295 | 320 | 321 | 351 | 785 |
| 300% Modulus, psi | 566 | 610 | 629 | 748 | 1845 |
| Elongation at Break, % | 993 | 908 | 987 | 701 | 418 |
| Tear Strength, pli | 271 |  |  |  |  |

EB Diol: HPVM-2202, Shell Chemical Co.  OH EW 1800
MDI: Mondur M, Bayer
Pentane diol: trimethylpentane diol, Eastman  OH EW 73

TABLE 4

One Shot Polyurethanes of Table 3 — AGED

|  | C5 | C6 | 7 | 8 |
|---|---|---|---|---|
| Ingredients (wt. %) |  |  |  |  |
| EB DIOL | 77.7 | 77.8 | 78.0 | 77.4 |
| Pentane Diol | 6.1 | 5.9 | 5.8 | 5.9 |
| MDI | 16.2 | 16.2 | 16.2 | 16.7 |
| Hard Phase, % | 22 | 22 | 22 | 22 |
| NCO/OH Ratio | 1.02 | 1.04 | 1.06 | 1.08 |
| Properties: Aged |  |  |  |  |
| Hot Water, 100° C., 7 days |  |  |  |  |
| Tensile Strength, psi | 570 | 1310 | 1670 | 1710 |
| Tensile Retention, % | 29 | 68 | 87 | 89 |
| 100% Modulus, psi | 335 | 289 | 371 | 333 |
| 300% Modulus, psi | 456 | 436 | 545 | 526 |
| Elongation at Break, % | 1060 | 1590 | 1320 | 1290 |

EB Diol: HPVM-2202, Shell Chemical Co.  OH EW 1800
MDI: Mondur M, Bayer
Pentane diol: trimethylpentane diol, Eastman  OH EW 73

TABLE 5

Prepolymer Polyurethanes

|  | 10 | C11 | 12 | C13 |
|---|---|---|---|---|
| Ingredients (wt. %) |  |  |  |  |
| EB DIOL | 77.8 | 75.7 | 77.6 |  |
| TERATHANE 2000 |  |  |  | 78.0 |
| MDI | 17.8 | 17.4 | 17.8 | 18.9 |
| Prepolymer NCO/OH | 3.31 | 3.31 | 3.31 | 1.94 |
| Butane Diol | 4.4 |  | 3.9 | 3.2 |
| Pentane Diol |  | 6.9 | .69 |  |
| Butane/pentane diol |  |  | 9/1 |  |
| Hard Phase, % | 22 | 24 | 22 | 22 |
| NCO/OH Ratio | 1.02 | 1.02 | 1.02 | 1.02 |
| Properties |  |  |  |  |
| Shore A | 81 | 81 | 80 | 77 |
| Tensile Strength, psi | 2650 | 3206 | 2640 | 3890 |
| 100% Modulus, psi | 518 | 521 | 511 | 338 |
| 300% Modulus, psi | 1090 | 1191 | 1050 | 509 |
| Elongation at Break, % | 854 | 766 | 1191 | 1090 |

EB Diol: HPVM-2202, Shell Chemical Co.  OH EW 1800
TERATHANE 2000: PTMO, DuPont  OH EW 1000
MDI: Mondur M, Bayer
Pentane diol: trimethylpentane diol, Eastman  OH EW 73

TABLE 6

Prepolymer Polyurethanes of Table 5 — AGED

|  | 10 | C11 | 12 | C13 |
|---|---|---|---|---|
| Ingredients (wt. %) |  |  |  |  |
| EB DIOL | 77.8 | 75.7 | 77.6 |  |
| TERATHANE 2000 |  |  |  | 78.0 |
| MDI | 17.8 | 17.4 | 17.8 | 18.9 |
| Prepolymer NCO/OH | 3.31 | 3.31 | 3.31 | 1.94 |
| Butane Diol | 4.4 |  | 3.9 | 3.2 |
| Pentane Diol |  | 6.9 | .69 |  |
| Butane/pentane diol |  |  | 9/1 |  |
| Hard Phase, % | 22 | 24 | 22 | 22 |
| NCO/OH Ratio | 1.02 | 1.02 | 1.02 | 1.02 |
| Properties: Aged |  |  |  |  |
| Hot Water, 100° C., 7 days |  |  |  |  |
| Tensile Strength, psi | 2700 | 2200 | 2100 | 1350 |
| Tensile Retention, % | 102 | 69 | 80 | 35 |
| 100% Modulus, psi | 594 | 532 | 446 | 240 |
| 300% Modulus, psi | 918 | 906 | 698 | 302 |
| Elongation at Break, % | 1190 | 928 | 1250 | 2160 |

EB Diol: HPVM-2202, Shell Chemical Co.  OH EW 1800
TERATHANE 2000: PTMO, DuPont  OH EW 1000
MDI: Mondur M, Bayer
Pentane diol: trimethylpentane diol, Eastman  OH EW 73

TABLE 7

Prepolymer Polyurethanes

|  | C14 | C15 | C16 | C17 |
|---|---|---|---|---|
| Ingredients (wt. %) |  |  |  |  |
| EB DIOL Prepolymer | 88.9 |  |  |  |
| PPG 4000 Prepolymer |  | 86.3 |  |  |
| PTMO 2000 Prepolymer |  |  | 90.2 |  |
| PPG 2000 Prepolymer |  |  |  | 90.2 |
| NCO/OH Ratio | 2.0 | 2.0 | 2.0 | 2.0 |
| TDI | 3.1 | 3.6 |  |  |
| Curene 442 | 8.0 | 10.1 | 9.8 | 9.8 |
| Hard Phase, % | 22 | 24 | 22 | 22 |
| NCO/NH2 Ratio | 1.05 | 1.05 | 1.05 | 1.05 |
| Properties |  |  |  |  |
| Shore A | 59 | 86 | 75 | 89 |
| Tensile Strength, psi | 1009 | 1357 | 1484 | 5411 |
| 100% Modulus, psi | 209 | 590 | 328 | 863 |
| 300% Modulus, psi | 388 | 841 | 479 | 1871 |
| Elongation at Break, % | 900 | 698 | 1150 | 452 |
| Tear Strength, pli | 218 | 266 | 351 | 466 |

EB Diol: HPVM-2202, Shell Chemical Co.  OH EW 1800
TERATHANE 2000: PTMO, DuPont  OH EW 1000
PPG 2000: PPG glycols, BASF  OH EW 1000

TABLE 7-continued

Prepolymer Polyurethanes

|  | C14 | C15 | C16 | C17 |
|---|---|---|---|---|
| PPG 4000: PPG glycols, BASF | | | | OH EW 2000 |
| Curene 442: MOCA, Anderson Development | | | | |
| TDI: Mondur TD-80, Bayer | | | | |

TABLE 8

Prepolymer Polyurethanes of Table 7 — AGED

|  | C14 | C15 | C16 | C17 |
|---|---|---|---|---|
| Ingredients (wt. %) | | | | |
| EB DIOL Prepolymer | 88.9 | | | |
| PPG 4000 Prepolymer | | 86.3 | | |
| PTMO 2000 Prepolymer | | | 90.2 | |
| PPG 2000 Prepolymer | | | | 90.2 |
| NCO/OH Ratio | 2.0 | 2.0 | 2.0 | 2.0 |
| TDI | 3.1 | 3.6 | | |
| Curene 442 | 8.0 | 10.1 | 9.8 | 9.8 |
| Hard Phase, % | 22 | 24 | 22 | 22 |
| NCO/NH2 Ratio | 1.05 | 1.05 | 1.05 | 1.05 |
| Properties: Aged | | | | |
| Hot Water, 100° C., 7 days | | | | |
| Shore A | 69 | 66 | * | 78 |
| Tensile Strength, psi | 2071 | 86 | * | 386 |
| Tensile Retention, % | 205 | 6 | * | 7 |
| Elongation at Break, % | 1051 | 18 | * | 107 |

*Indicates complete failure
EB Diol: HPVM-2202, Shell Chemical Co.  OH EW 1800
TERATHANE 2000: PTMO, DuPont  OH EW 1000
PPG 2000: PPG glycol, BASF  OH EW 1000
PPG 4000: PPG glycols, BASF  OH EW 2000
TDI: Mondur TD-80, Bayer
Curene 442: MOCA, Anderson Development

We claim:

1. A thermoplastic polyurethane, produced by a process comprising reacting a hydrogenated polydiene diol having from 1.6 to 2 terminal hydroxyl groups per molecule and a number average molecular weight between 500 and 20,000 with an isocyanate or isocyanate prepolymer having 2 isocyanate groups per molecule, said diol being present in the reaction mixture of the diol and the isocyanate or isocyanate prepolymer in an amount sufficient to provide a polyurethane that retains more than 70 percent of original tensile strength after aging in water for 7 days at a temperature of at least 70° C., the reaction optionally occurring in the presence of a chain extender having 2 hydroxyl groups per molecule.

2. A thermoplastic polyurethane produced by a process comprising reacting a hydrogenated polydiene diol having from 1.9 to 2.0 terminal hydroxyl groups per molecule, 1,4-addition between 40 percent and 60 percent, and a number average molecular weight between 1000 and 10,000 with an isocyanate having 2 isocyanate groups per molecule, said diol being present in the reaction mixture of the diol and the isocyanate in an amount sufficient to provide a polyurethane that retains at least 85 percent of original tensile strength after aging in water for seven days at a temperature of at least 70° C., the reaction optionally occurring the presence of a branched chain extender having 2 hydroxyl groups per molecule.

3. The polyurethane of claim 1, wherein the polydiene diol has from 1.9 to 2 hydroxyl groups per molecule.

4. The polyurethane of claim 1, wherein the polydiene diol has a number average molecular weight between 1,000 and 10,000.

5. The polyurethane of claim 1, wherein the polydiene diol is a hydrogenated polybutadiene diol having from 1.9 to 2.0 terminal hydroxyl groups per molecule, 1,4-addition between 40% and 60%, and a number average molecular weight between 1,000 and 10,000.

6. The polyurethane of claim 1, wherein the isocyanate is 4,4'-diphenylmethane diisocyanate.

7. The polyurethane of claim 1, wherein the polydiene diol and the isocyanate are first reacted to form a prepolymer in the absence of a chain extender and the prepolymer is further reacted with a chain extender having two functional groups per molecule, the functional groups being reactive with the isocyanate groups on the prepolymer.

8. The polyurethane of claim 7, wherein the chain extender is 1,4-butanediol, 2,2,4-trimethyl-1,3-pentanediol, or mixtures thereof.

9. The polyurethane of claim 2, wherein the isocyanate is 4,4'-diphenylmethane diisocyanate.

10. The polyurethane of claim 2, wherein the polydiene diol and the isocyanate are reacted to form a prepolymer in the absence of a chain extender and the prepolymer is further reacted with a chain extender having two functional groups per molecule, the functional groups being reactive with the isocyanate groups on the prepolymer.

* * * * *